April 29, 1958     M. C. APPLEGATE     2,832,275

LIGHT SYSTEM FOR AUTOMATIC PHOTOGRAPHIC APPARATUS

Filed Dec. 21, 1955     3 Sheets-Sheet 1

MARVIN C. APPLEGATE
INVENTOR.

BY
ATTORNEY

April 29, 1958     M. C. APPLEGATE     2,832,275
LIGHT SYSTEM FOR AUTOMATIC PHOTOGRAPHIC APPARATUS
Filed Dec. 21, 1955     3 Sheets-Sheet 3

MARVIN C. APPLEGATE
INVENTOR.

BY

ATTORNEY

United States Patent Office 2,832,275
Patented Apr. 29, 1958

2,832,275

LIGHT SYSTEM FOR AUTOMATIC
PHOTOGRAPHIC APPARATUS

Marvin C. Applegate, La Canada, Calif., assignor, by mesne assignments, to Philip S. Allen, Carlsbad, Calif., an individual Application December 21, 1955, Serial No. 554,470

6 Claims. (Cl. 95—82)

This invention relates to a light and camera system for an automatic photographic apparatus, and particularly to such a system for a coin-operated picture machine adapted to expose and develop a plurality of pictures on a single film strip.

In co-pending application Serial No. 468,178, filed November 12, 1954, for Automatic Photographic Apparatus, there is shown and described an automatic coin-operated photographic apparatus, particularly with relation to a mechanism for developing a plurality of films or film strips. The present application is a continuation-in-part of my application for United States Letters Patent, Serial No. 468,179, filed November 12, 1954, now abandoned, entitled Light and Camera System for Automatic Photographic Apparatus and relates to the light and camera system which is employed in exposing the film strips developed with the apparatus set forth in said first mentioned co-pending application.

In exposing a number of pictures on each film strip, it is extremely desirable to achieve varied lighting effects in order to greatly increase the likelihood that the subject will be best and most flatteringly illuminated during at least the exposing of one or two of the pictures. Stated otherwise, certain persons require light from certain angles to result in the most flattering picture, and thus the one which is most satisfactory, whereas other persons require light from other angles to achieve the same result. Accordingly, it is desirable to provide a number of subject illumination lights at different points in the booth or cabinet in which the subject sits while being photographed, and to energize different combinations of such lights for different pictures on the film strip.

In addition to changing the angle of incidence it has been found most desirable to provide means for changing the light intensity on the subject. Thus, the light reflective characteristics of different skins as well as the color of both the subject's hair and raiment have a marked affect on the light intensity transmitted to the film. For example, a very light complexioned person dressed in light colors requires much lower intensity lighting than does a dark complexioned subject wearing dark clothing. The difference is especially pronounced as regards subjects of the colored races in contrast with those of the white race.

The attaining of the desired varied lighting effects with safety and with the intense light necessary for the proper exposure of the film has, however, proved to be difficult. One difficulty has been in achieving the necessary synchronization of the lighting with the camera shutter and despite any backlash or play that may exist between the camera motor and the components it operates. Another difficulty has been in the creation of intense strobe lighting effects with safety and despite the fact that strobe lights require exceedingly high voltages as compared to ordinary lights. The difficulties in attaining intense strobe lighting at the correct times relative to shutter position, and in insuring adequate safety to the maintenance men who service the apparatus, have rendered impractical and unsatisfactory any previous attempts to provide varied lighting effects of the type indicated.

In view of the above factors characteristic of light systems and cameras for automatic photographic apparatus, it is an object of the present invention to provide an automatic photographic apparatus incorporating novel lighting means for illuminating the subject in different ways during exposure of the various pictures on the film strip.

Another object of the invention is to provide improved means for synchronizing the camera shutter with the various lights effecting illumination of the subject during exposure of the pictures.

Still a further object is the provision of convenient easily operated means for shifting the light intensity of the lighting system to accord with those best suited to the complexion and dress of the subject and as an incident to the imitation of the studio cycle for making a connected series of exposures.

Another object is to provide safety means for eliminating the possibility of high voltage shocks to the maintenance men who service the apparatus.

These and other objects and advantages of the invention will be more fully set forth in the following specification and claims considered in connection with the attached drawings to which they relate.

Figure 1:
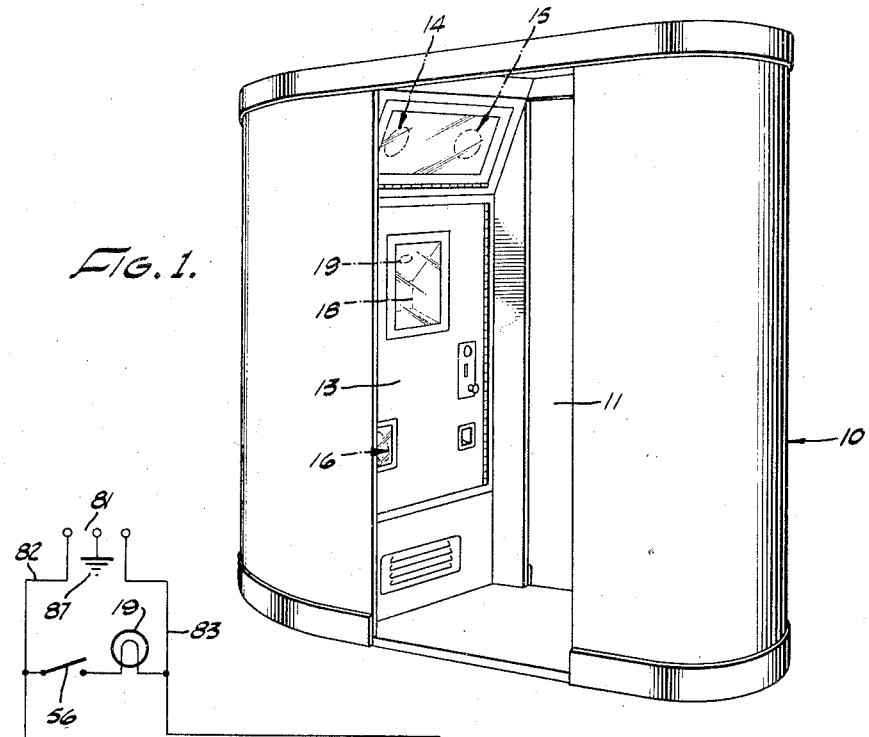
Figure 1 is a perspective view showing an automatic coin operated picture booth or studio incorporating the light and camera system of the invention.
Figure 3:
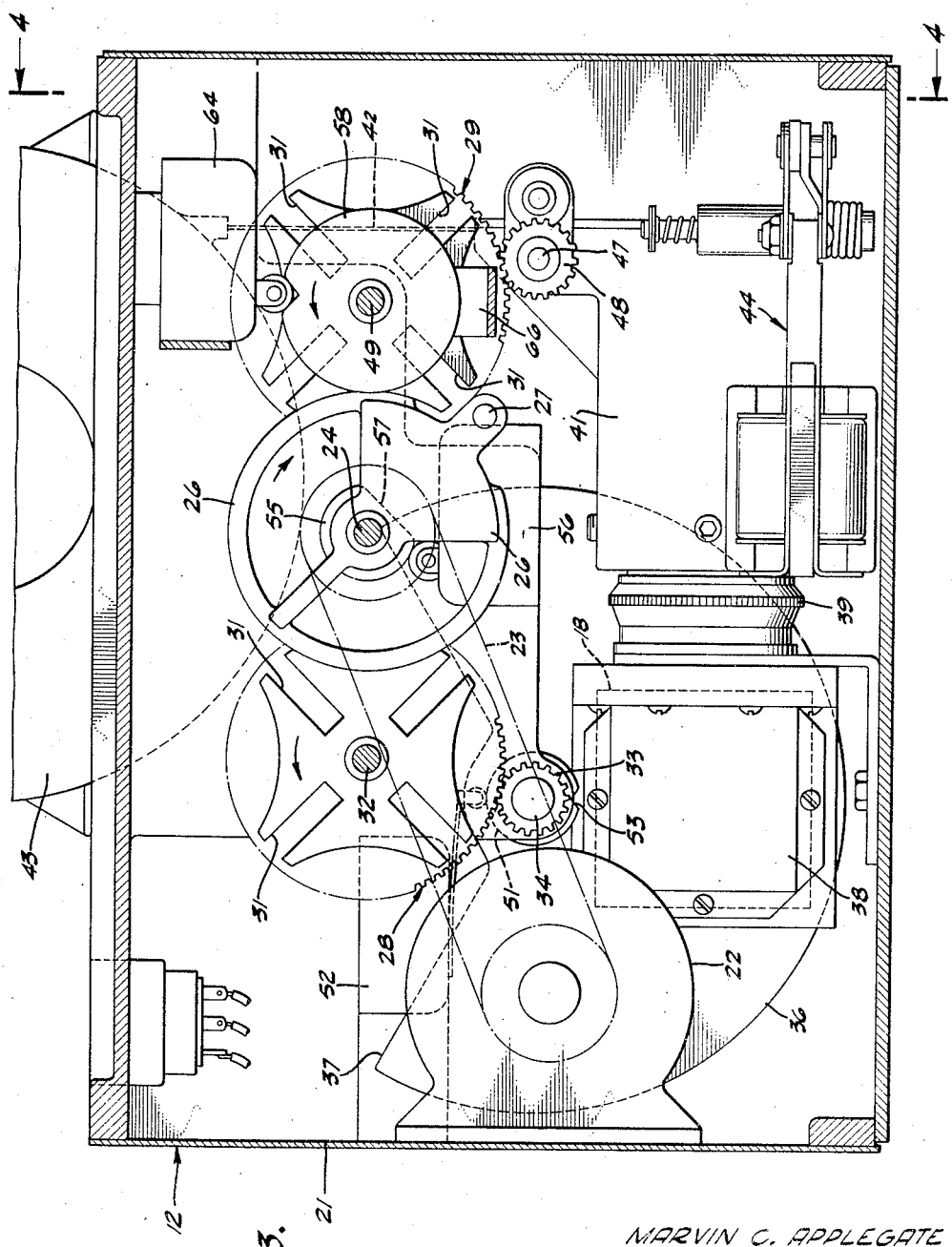
Figure 3 is a vertical longitudinal sectional view illustrating the internal components of the camera means incorporated in the apparatus of Figure 1.
Figure 4:
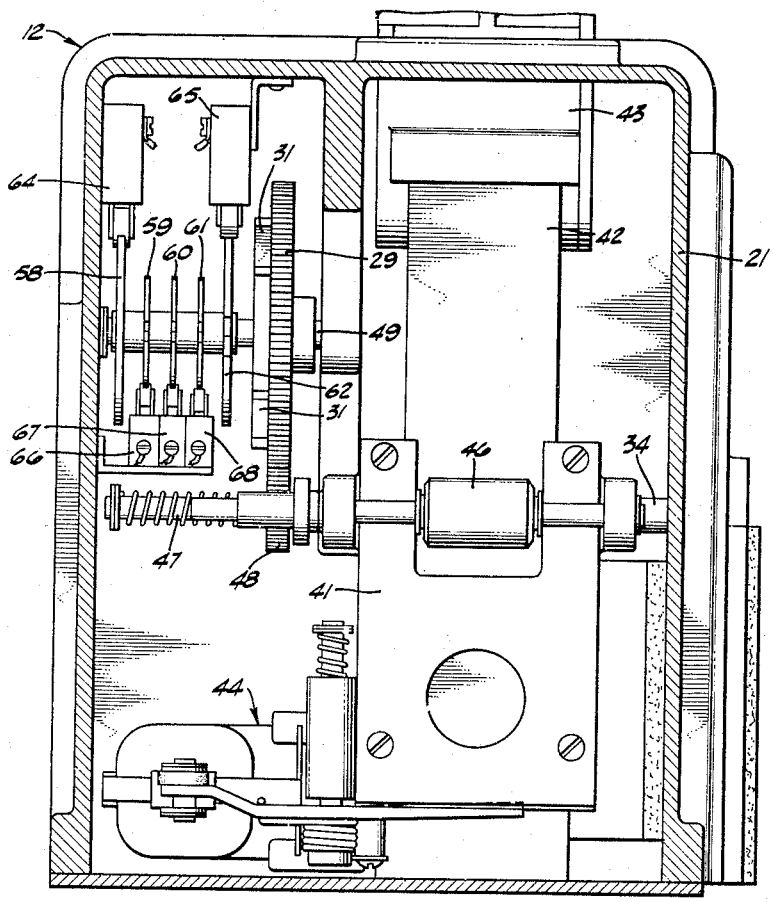
Figure 4 is a transverse sectional view taken along line 4—4 of Figure 3.

Referring now to the drawings and particularly to Figure 1, there is illustrated an automatic coin operated picture studio having a chamber 11 in which a subject or customer sits and poses while his picture is taken by camera means 12 shown in Figures 3 and 4. The camera means 12, and the apparatus for developing a film strip after its exposure by the camera means, are mounted behind a dividing wall or panel as shown and described in the co-pending application Serial No. 468,178, cited above. The entire wall has been given the reference numeral 13, although the wall includes one or more hinged doors. Suitably mounted in wall or panel 13 are three strobe or electronic flash type floodlights 14, 15 and 16, the first two of which are disposed at the upper portion of the panel and the latter one of which is disposed at the lower left portion thereof. These lights are energized in various combinations or groupings, as shown in Figures 6-9, to illuminate the subject in different ways while his picture is taken.

In addition to providing a mounting for the lights 14-16, and also for other portions of the apparatus such as coin slot and coin return means, panel 13 is provided with a central light passage or window 18 leading to the camera means 12 and through which the picture of the subject is taken. A light 19 is provided in one wall of passage 18 and is referred to as the instruction light since it is this light which is energized in order to inform the customer as to when he should adjust or pose for the various pictures in the film strip.

The camera means 12 is generally structurally the same as described in detail in Patent 2,534,214 issued to Philip S. Allen on December 19, 1950, for a Camera Shutter and Film Actuating Mechanism. Accordingly, the mechanical details of the camera means will not be described herein except insofar as they relate particularly to the operation of the subject illumination lights 14–16 and the instruction light 19.

Referring to Figures 3 and 4, camera means 12 comprises a suitable casing or housing 21 on one wall of which is mounted an electric drive motor 22. Motor 22 is connected through suitable gears and a chain, indicated schematically at 23, to rotate a Geneva actuator shaft 24, the latter being suitably journaled in the walls of housing 21. Fixedly mounted on shaft 24 is an actuator element 26 including a pin 27 which operates to drive first and second Geneva gears 28 and 29. Each gear 28 and 29 is formed with four equally spaced radially extending slots 31 adapted to receive the pin 27, the arrangement being such that movement of pin 27 into and out of a slot 31 effects rotation of the associated gear 28 or 29 for 90 degrees or one-quarter of a revolution.

The first Geneva gear 28 is mounted on a shaft 32 which is suitably journaled in the housing 21, the gear being meshed with a relatively small gear 33 on a shaft 34 also journaled in the housing. Mounted on shaft 34 is a shutter disc 36 having a cut out portion or window 37. The shutter disc 36 is interposed between the light passage 18, as shown in Figures 1 and 3, and an inclined mirror 38 serving to reflect light from passage 18 at right angles and through lens means 39 into a film housing or chamber 41.

The passage of light rays through passage 18 and lens means 39 to the chamber 41, of course, is dependent upon the rotated position of the shutter disc 36, the light being blocked at all times except when at least part of the window 37 is registered with the passage 18. The gear ratio between Geneva gear 28 and small gear 33 is such that shutter 36 makes one full revolution for each quarter revolution of gear 28, or one full revolution each time pin 27 actuates gear 28.

The light which enters through lens means 39 into film chamber 41 is adapted to strike a sensitized film strip 42, the latter being fed from a storage roll 43 to the chamber 41 and thence through suitable slots and guides to the film developer portions of the apparatus. After the taking of four pictures in sequence on a section of the film strip 42, and as described in Patent 2,534,214 and in the application referred to, the exposed section of the film strip is cut off by a solenoid operated knife mechanism 44. The exposed film strip section is then developed automatically and delivered to the customer.

The means for feeding film strip 42 from the storage roll 43 into and through chamber 41 comprises a pair of friction rolls 46 engaged with opposite sides of the strip. One of the friction rolls 46 is mounted on a shaft 47 for driving by a gear 48 thereon. Gear 48 is meshed with the second Geneva gear 29, indicated heretofore, and which is fixedly mounted on a shaft 49 journaled in housing 21.

In the operation of the camera means 12 as thus far described, clockwise rotation of shaft 24 by motor 22 causes pin 27 to enter a slot 31 in Geneva gear 28 and rotate the latter counterclockwise a quarter of a revolution. This operates through gear 33 to rotate shaft 34 and shutter disc 36 a full revolution, a picture then being exposed as the window 37 of the shutter disc rotates past the passage or opening 18. Thereafter, pin 27 rotates into engagement with a slot 31 of the second Geneva gear 29 to effect rotation thereof a quarter revolution. Such movement of gear 29 operates through gear 48, shaft 47 and friction rolls 46 to feed down the film strip 42 for a distance equal to the size of the picture taken on the film strip. The cycle then continues until four pictures have been exposed and the film strip has been fed down four times, after which the cut off mechanism 44 operates and the strip section containing the four pictures is developed as indicated.

Mounted on the shutter shaft 34 is a cam 51 which engages a roller on the arm of a switch 52. Cam 51 is shaped with a notch 53 into which the switch roller drops once during each revolution of shaft 34 and shutter 36. Switch 52 is so constructed that when its roller is in notch 53 the switch will be closed, and when the switch roller engages the remainder of cam 51 the switch will be open. The mounting of cam 51 and switch 52 is such that the switch will be closed only when window 37 is fully registered with light passage 18, and will be open when the window is not registered with the light passage.

Similarly to the case of cam 51 and switch 52 associated with shaft 34, a cam 55 is mounted on the Geneva actuator shaft 24 and engages the roller of a second switch 56. Cam 55 is provided with a flat 57, and the construction is such that switch 56 will be open when the main body of cam 55 engages the switch roller, and will be closed when flat 57 engages the switch roller. Cam 55 and switch 56 are so constructed and mounted that switch 56 is closed a short period of time (preferably one second) before closing of switch 52 by cam 51. Switch 56 then opens at approximately the same time that switch 52 is closed.

Figure 5:
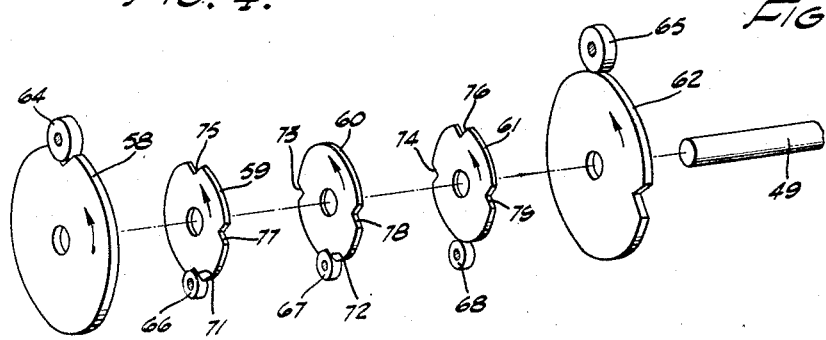
Figure 5 is an exploded perspective view illustrating the cam and switch means on one of the shafts shown in Figure 4.

Shaft 49 of Geneva film feed gear 29 is provided with five cams 58–62 best shown in Figures 4 and 5. Cams 58 and 62 are associated, respectively, with switches 64 and 65 which form part of the control circuit described in detail in the cited co-pending application. More specifically, cam 58 and the associated switch 64 are adapted to stop the operation of camera motor 22 at the end of the camera cycle, whereas cam 62 and the associated switch 65 are adapted to start operation of the film developing mechanism as the second exposed picture on film strip 42 is fed down.

Cams 59, 60 and 61 are respectively associated with switches 66, 67 and 68, the latter being suitably mounted on a bracket adjacent the cams as shown in Figure 4. The cams 59 and 60 are formed with aligned notches 71 and 72, cams 60 and 61 with aligned notches 73 and 74, cams 59 and 61 with aligned notches 75 and 76, and cams 59—61 with aligned notches 77—79.

The various groups of aligned notches specified above are provided at 90 degree angles from each other, each cam 59—61 having two notches at diametrically opposite points and a third notch 90 degrees therebetween, the remaining 180 degrees of each cam being unnotched. The construction of switches 66–68 is such that when their rollers are inserted into a notch 71–79 the switches will be closed, being open at all other times and when the rollers are on unnotched cam portions.

Figure 2:
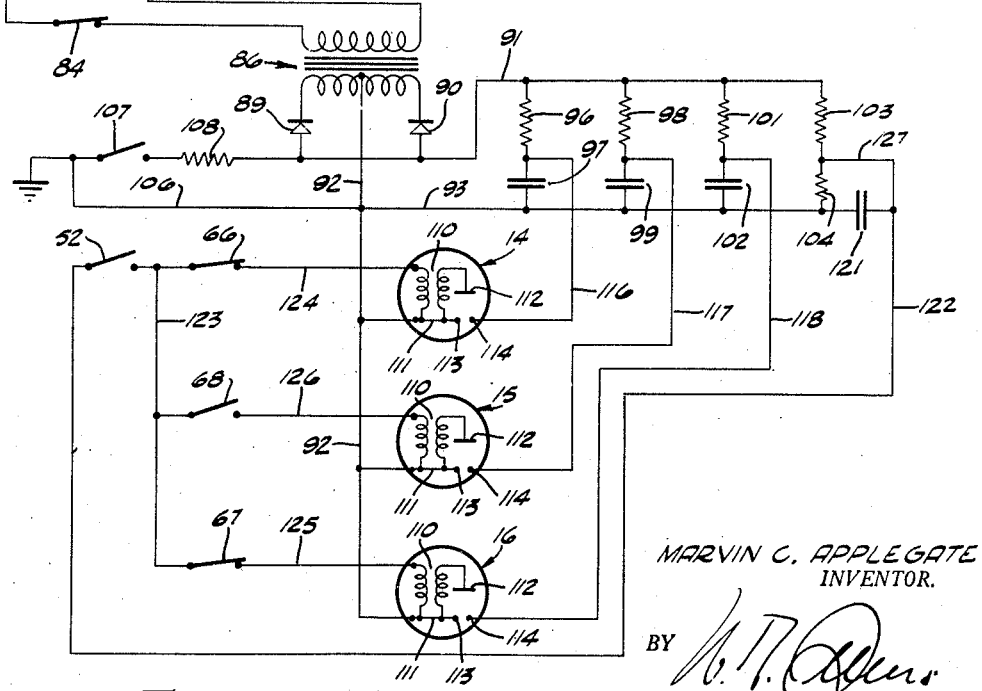
Figure 2 is a schematic wiring diagram illustrating the light system.

Referring next to the schematic wiring diagram shown in Figure 2, a standard 110 volt alternating current power source is illustrated at 81 as connected to a pair of lines 82 and 83 leading through a cut-off switch 84 to my light intensity range shifting switch 85 and the primary of a transformer 86. The source 81 is grounded, as indicated at 87, to increase the safety of operation of the unit. Connected in series between lines 82 and 83 are the instruction light 19 and the switch 56, the latter being described in connection with cam 55 shown in Figure 3.

The electrical connections for light intensity switch 85 will of course be located behind panel 13 of the studio while the control knob 85a and its pointer will be positioned on the panel front along with simple instructions guiding the subject in setting it in the proper position. As shown in Figure 2, the switch is operable to connect the power source to a greater or smaller number of turns on the primary of the transformer. Experience has shown that the switch contact points should be selected in such manner as to change the output voltage of the transformer secondary over a range somewhat in excess of 100 volts A. C. This operator or subject controlled shift in light intensity taken with that provided for automatically by the circuit and lighting arrangement of this invention provides a highly satisfactory variable lighting effect so essential to reliable results in a coin controlled photo studio.

The terminals of the secondary of transformer 86 are connected through rectifier elements 89 and 90 to a lead 91. Furthermore the transformer secondary is tapped at an intermediate point by a lead 92 which connects to another lead 93. Connected between leads 91 and 93 are a first resistor 96 and capacitor 97, a second resistor 98 and capacitor 99, a third resistor 101 and capacitor 102, and fourth and fifth resistors 103 and 104, all of these elements being respectively series arranged as indicated. Lead 93 connects through a lead 106 to ground, the lead 106 also connecting through a switch 107 and resistor 108 to the lead 91.

Each light 14–16 is of a suitable strobe type embodying a transformer 110, a lead 111 connecting to one terminal of both the transformer primary and transformer secondary, a plate 112 connected to the other terminal of the transformer secondary, and terminals 113 and 114 the former of which is connected to lead 111. Terminal 114 of lamp 14 is connected through a lead 116 to a point between resistor 96 and capacitor 97. Correspondingly, terminals 114 of lamps 15 and 16 are connected, respectively, through leads 117 and 118 to points between resistor 98 and capacitor 99, and resistor 101 and capacitor 102.

A capacitor 121 is connected between lead 93 and a lead 122 which connects to the switch 52 described in connection with cam 51 shown in Figure 3. The other side of switch 52 connects to a lead 123 running to one side of all three switches 66–68. The remaining terminals of switches 66–68 connect through leads 124–126, respectively, to the primaries of transformers 110 of lamps 14, 16 and 15. The other terminal of each such primary is connected to an extension of the lead 92 which, as previously stated, connects to lead 93 and to an intermediate point in the secondary of transformer 86.

Transformer 86 is a step-up transformer adapted to convert the 110 volts in its primary to a maximum of approximately 600 volts in its secondary when switch 85 is positioned to include all of the primary turns in the power supply circuit. This 600 volts A. C. is converted to approximately 450 volts D. C. in lead 91, due to operation of the rectifier circuits and other factors. Because of the voltage drop in resistor 103, the voltage across resistor 104 is approximately 100 volts D. C., this voltage being transmitted to capacitor 121 through the described connection and through a lead 127, the latter being connected to one capacitor terminal and to a point between resistors 103 and 104.

*Operation*

The operation of the light and camera system of the invention is as follows. Let it be assumed that all of the parts, switches, etc., are initially in the position shown in Figures 2–5 of the drawings. Power is then fed from a source 81 through the closed switch 84, light intensity control switch 85 and to the primary of transformer 86. A very light complexioned person will follow instructions on panel 13 to set knob 85a to a designated stop on the panel. This setting will correspond to a minimum number of primary turns of transformer 86 in circuit with the power source. This will naturally result in all the lights connected to the secondary being energized at a lower intensity than is the case where switch 85 to be set for a darker complexioned person with more turns of the primary connected to the power source. Approximately 450 volts D. C. will therefore be applied between lead 91 and the grounded lead 93, and thus across the elements 96—97, 98—99, 101—102, and 103—104. It is pointed out that this voltage is direct due to operation of rectifiers 89 and 90 one of which prevents conduction of current during one half cycle of the voltage wave, and the other of which prevents conduction of current during the other half cycle. Capacitors 97, 99, and 102 are thus charged to a relatively high voltage, and capacitor 121 is charged to a lower voltage due to the voltage divider effect between resistors 103 and 104.

Energization of camera motor 22 will then operate through chain 23 to drive the Geneva actuator element 26 clockwise as viewed in Figure 3, and cam 55 will cause closing of switch 56 to energize light 19. Instruction light 19 being energized, the customer in the studio 10 is instructed to adjust himself for taking of the first picture. Pin 27 then rides into and out of a slot 31 of the first Geneva gear 28. Gear 28 will therefore rotate counterclockwise 90 degrees, which operates through gear 33 to rotate shutter shaft 34 and disc 36 a full 360 degrees. At the same time that the window 37 in shutter 36 becomes fully registered with light passage 18, switch 52 is closed by cam 51 to complete the trigger circuit from capacitor 121 through lead 122 and switch 52 to lead 123. Furthermore, and at approximately the same time, switch 56 is opened to de-energize instruction light 19.

As shown in Figure 5, notches 71 and 72 of cams 59 and 60 initially receive the rollers of switches 66 and 67, so that these switches are closed. The voltage in lead 123 is therefore transmitted through switches 66 and 67 and through the primaries of transformers 110 of lights 14 and 16 to the grounded lead 92. Trigger voltages are thus applied to the transformer secondaries in these lights and thus to their plates 112. Triggering of the lights 14 and 16 is therefore effected, and capacitors 97 and 102 discharge respectively through leads 116 and 118, lights 14 and 16, and lead 92 to ground.

Figure 6:
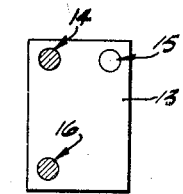
Figures 6-9 illustrate the strobe lights for illuminating the subject, and in various conditions of energization and de-energization.

The lights 14 and 16 are thus energized as shown in Figure 6, to illuminate the subject with a brilliant light and effect exposure of the first picture on the film strip. This illumination is of very short duration, or the time required for discharge of capacitors 97 and 102. The picture having been taken, switch 52 closes so that the condensers will recharge.

Figure 7:
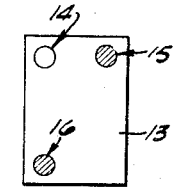

After exposure of the first picture, the Geneva actuator pin 27 rides into and out of slot 31 of the second Geneva gear 29, causing counterclockwise rotation thereof for a quarter revolution or 90 degrees. Gear 48 is thus rotated clockwise to drive the feed down rolls 46 and cause feeding of film strip 42 for a distance equal to the length of one picture. This feed down action, resulting from the 90 degree turn of shaft 49, causes cams 59—61 to rotate counterclockwise 90 degrees, as viewed in Figure 5, and bring notches 73 and 74 of cams 60 and 61 into registry with switches 67 and 68. Switches 67 and 68 are therefore closed, whereas switch 66 is opened, so that upon the next closing of switch 52 the lights 15 and 16 will be energized and light 14 will be de-energized as shown in Figure 7. Such energization of lights 15 and 16 is caused by discharge of the recharged capacitors 99 and 102 after the triggering action caused by discharge of capacitor 121 as before.

Figure 8:
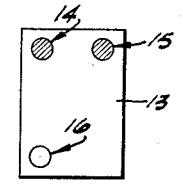
Figure 9:
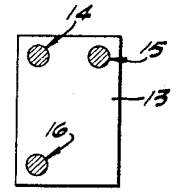

The cycle then continues with first an exposure of a picture due to energization of predetermined combinations of lamps 14–16, and then with feed down of the picture by feed down rolls 46. As shown in Figures 8 and 9, lamps 14 and 15 are energized during exposure of the third picture, and all of the lamps are energized during exposure of the fourth picture.

In the described manner, therefore, four pictures are taken on a single film strip and with a different lighting effect for each picture. It follows that each of the four pictures will be different from the others, which will create a distinct varied effect greatly improving the likelihood that the customer will be satisfied with the pictures taken.

It is to be understood that instead of using a different combination of lights 14–16 for each picture, the same combination could be used for several pictures, and other combinations for the remaining pictures.

The switches 84 and 107 shown in Figure 2 are associated with the door in wall or panel 13, and which is opened to provide access to the camera 12 and the developer apparatus. The switches are so arranged that switch 84 will be closed and switch 107 open when the door is closed, whereas switch 84 will be open and switch 107 closed when the door is open. Since switch 84 controls the energization of transformer 86 from power source 81, it follows that the transformer will be de-energized every time the door is open but will be energized when the door is closed. Closure of switch 107 when the door is opened creates a shorting circuit through resistor 108 and effects discharge of the capacitors 97, 99, 102 and 121. It is thus impossible for a charge to remain on the capacitors or on transformer 86 after the door starts to open with the result that work can be performed on the apparatus without the slightest hazard to the serviceman. In this manner, maintenance of the unit is rendered extremely safe despite the fact that high voltages are employed in order to achieve the desired lighting effects.

While the particular apparatus herein shown and disclosed in detail is fully capable of attaining the objects and providing the advantages hereinabove stated, it is to be understood that it is merely illustrative of the presently preferred embodiments of the invention and that no limitations are intended to the details of construction or design herein shown other than as defined in the appended claims.

I claim:

1. In a photographic apparatus, a studio or booth having a door therein, electronic flash light means to illuminate a subject when in said studio and with varying lighting effects, capacitor means associated with said electronic flash light means for energizing the same momentarily from energy stored by said capacitor means, and means associated with said door and with said capacitor means to effect automatic charging of said capacitor means when said door is closed and automatic discharging of said capacitor means through said strobe light means when said door is opened.

2. A camera and light system, which comprises a camera motor, a Geneva actuator driven by said motor, first and second Geneva gears driven alternately and intermittently by said actuator, a camera shutter associated with said first gear for driving thereby, a film feed means associated with said second gear for driving thereby to shift the position of a film, light passage and lens means to transmit light from a subject to said film when said shutter is at predetermined positions, a plurality of floodlights adapted when energized to illuminate said subject, switch means associated with said second gear and adapted to set up circuits to a certain combination of said lights when said second gear is in one position and to a different combination of said lights when said second gear is in another position, and switch means associated with said shutter to complete the circuits to said lights when said shutter is at said predetermined positions.

3. The invention as claimed in claim 2, in which an instruction light is provided, and switch means are associated with said Geneva actuator to effect energization of said instruction light when said shutter is at positions other than said predetermined positions.

4. The invention as claimed in claim 2, in which said lights are electronic flash type lights.

5. The invention as claimed in claim 2, in which said floodlights are three in number and are disposed two above the head of said subject and one below and offset laterally to one side of the head of said subject.

6. The invention as defined in claim 2 characterized in the provision of operator controlled means for adjusting the voltage applied to said floodlights to provide a particular light intensity appropriate for the complexion of the person being photographed.

References Cited in the file of this patent

UNITED STATES PATENTS

| | | |
|---|---|---|
| 1,682,931 | Pifer | Sept. 4, 1928 |
| 1,946,323 | Kucharski | Feb. 6, 1934 |
| 1,983,402 | Rodman | Dec. 4, 1934 |
| 2,295,000 | Morse | Sept. 8, 1942 |
| 2,486,727 | Anderson | Nov. 1, 1949 |